(12) United States Patent
Petitjean et al.

(10) Patent No.: US 8,202,042 B2
(45) Date of Patent: Jun. 19, 2012

(54) EXHAUST GAS TURBOCHARGER WITH ADJUSTABLE SLIDE RING

(75) Inventors: Dominique Petitjean, Julienrupt (FR);
Phillipe Arnold, Hennecourt (FR);
David Rogala, Thaon-les-Vosges (FR);
Patrick Masson, Urimenil (FR)

(73) Assignee: Honeywell International Inc., Morristown, NJ (US)

( * ) Notice: Subject to any disclaimer, the term of this patent is extended or adjusted under 35 U.S.C. 154(b) by 975 days.

(21) Appl. No.: 11/579,372

(22) PCT Filed: May 3, 2004

(86) PCT No.: PCT/EP2004/004674
§ 371 (c)(1),
(2), (4) Date: Aug. 18, 2008

(87) PCT Pub. No.: WO2005/106210
PCT Pub. Date: Nov. 10, 2005

(65) Prior Publication Data
US 2009/0003995 A1    Jan. 1, 2009

(51) Int. Cl.
*F01B 25/00*    (2006.01)
(52) U.S. Cl. .............. 415/157; 415/206; 415/214.1
(58) Field of Classification Search .......... 415/157, 415/167, 205, 206, 148, 146, 147, 151, 158, 415/152, 156, 173.3, 174.2, 170.1; 60/602, 60/600, 614, 615; 137/458
See application file for complete search history.

(56) References Cited

U.S. PATENT DOCUMENTS

| 4,387,573 | A | * | 6/1983 | Parker | 60/611 |
| 4,499,731 | A | * | 2/1985 | Moser | 60/602 |
| 4,586,336 | A | * | 5/1986 | Horler | 60/602 |
| 4,776,168 | A | * | 10/1988 | Woollenweber | 60/602 |
| 4,802,817 | A | * | 2/1989 | Tyler | 415/157 |
| 5,441,383 | A | * | 8/1995 | Dale et al. | 415/158 |
| 5,758,500 | A | | 6/1998 | Sumser et al. | |
| 5,855,117 | A | * | 1/1999 | Sumser et al. | 60/602 |
| 5,971,704 | A | * | 10/1999 | Blattmann | 415/173.2 |
| 6,443,696 | B1 | * | 9/2002 | Erdmann et al. | 415/157 |

FOREIGN PATENT DOCUMENTS

| DE | 3831687 A1 | * | 3/1990 |
| EP | 0034915 A1 | * | 9/1981 |
| EP | 1304447 A1 | * | 4/2003 |
| WO | WO2004022924 | | 3/2004 |

OTHER PUBLICATIONS

PCT/ISR PCT/EP2004-04674.

* cited by examiner

*Primary Examiner* — Ninh H Nguyen
*Assistant Examiner* — Christopher R Legendre
(74) *Attorney, Agent, or Firm* — Alston & Bird LLP

(57) ABSTRACT

A turbine of a turbocharger includes a floating insert which defines a nozzle for passing a fluid and which is supported axially slidable with respect to a housing by a sliding support. Furthermore, the turbine comprises a sealing member for preventing a flow of fluid between the floating insert and the housing. The sealing member is axially expandable and has a fixed end attached to the turbine housing and an opposite movable end attached to the floating insert.

9 Claims, 4 Drawing Sheets

EXHAUST GAS TURBOCHARGER WITH ADJUSTABLE SLIDE RING

The present invention relates to a turbine of a turbocharger and in particular to a turbine of a turbocharger having an adjustable throat. Furthermore, the invention relates to a turbocharger comprising a turbine having an adjustable throat.

In a conventional turbocharger for use in association with internal combustion engines, a turbocharger having an adjustable nozzle or throat is known from the state of the art. Such a conventional turbocharger comprises an exhaust gas driven turbine which, in turn, drives an inlet air compressor so as to compress inlet air to be supplied to a combustion chamber of the internal combustion engine.

Since the requirements with respect to emissions and fuel consumption have increased in the past, the need for a turbocharger with an improved efficiency has been established. Due to the above requirements, adjustable turbochargers for increasing the operation range based on the operation conditions of the associated internal combustion engine are needed.

According to the state of the art, a turbine of a turbocharger comprises a floating insert which is slidably mounted with respect to a housing. The floating insert forms an annular nozzle or passage for passing the fluid towards a turbine wheel. The annular passage is adjustable by axially moving the floating insert.

It is the object of the present invention to provide a turbine of a turbocharger having an adjustable throat providing an improved reliability and an enhanced efficiency. Furthermore, it is the object to provide a turbocharger which comprises such a turbine.

The object is achieved by a turbine of a turbocharger having the features of claim 1. Furthermore, the object is achieved by a turbocharger having the features of claim 11. Further advantageous developments are defined by the dependent claims.

According to a first aspect of the present invention, a turbine of a turbocharger comprises a floating insert, said floating insert defining a nozzle for passing a fluid and being supported axially slidable with respect to a housing portion by a sliding support means, further comprising a sealing means extending between the turbine housing and said floating insert so as to cut off a flow through a radial gap formed between said floating insert and said turbine housing.

In the turbocharger arrangement having the sliding piston as a floating insert for adjusting the throat of the nozzle, during operation of the turbocharger a high pressure area is formed outside the floating insert and a low pressure area is formed inside the floating insert and at the outlet thereof. Therefore, the pressure difference in the exhaust gas is present between the two pressure areas. A gap is formed between the floating insert and the housing portion. According to the present invention a sealing means is provided and arranged to as to seal said gap and to prevent the flow of exhaust gas through said gap. Thereby, the efficiency is increased due to a larger flow through the turbine wheel.

Preferably, said sealing means extends between said housing portion and said floating insert so as to cut off the flow through the radial gap formed between said floating insert and said housing portion. Such a structure prevents the flow of the exhaust gas through the gap between the floating insert and the housing portion.

In a preferable form of the invention, said sealing means is formed by an axially expandable sealing device. By using such an expandable device the movement of the floating insert can be absorbed while the sealing state is maintained.

Preferably, said sealing means is formed by bellows having a substantially cylindrical shape. By forming said sealing means by bellows, a complete cutting off of the flow through the gap between the floating insert and the housing portion is enabled.

Preferably, a movable end of said sealing means is fit into a recess formed in the outer circumference of said floating insert. Thereby, the entire gap between the floating insert and the housing portion is sealed and the flow through the gap cut off.

Preferably, a movable end of said sealing means is attached to a boss portion formed at a front portion of said floating insert. The attachment of the moveable end of the sealing means is advantageous, since the circular surface thereof can be fixed in a reliable and simple manner.

Preferably, a fixed end of said sealing means is clamped between a gap formed between said turbine housing and a discharge housing. The mating surfaces of the housing portions can be utilized as clamping means so as to simplify the structure, since no further attachment means is necessary, such as gluing or the like.

However, the position of the bellows can be set to any position as long as the flow through said gap between the floating insert and the housing portion is cut off by this arrangement.

Preferably, said discharge housing is attached to said turbine housing by a clamp. However, the connection between the turbine housing and the discharge housing can be achieved by any means as long as an appropriate connection is secured. Such optional means can comprise weld portions, bolted joints or the like.

Preferably, said sealing means is an elastic member such that an urging force is generated acting from said turbine housing to said floating insert. Since it is possible to set the urging force depending on the deflection of said sealing means, the sealing means can act as an urging member. Hence, the position of the floating insert can be returned to a predetermined position such as an initial position.

Preferably, the axial position of the floating insert is determined by the urging force generated at said axial position of said floating insert and a resulting force generated by differences among pressures acting on said floating insert. In other words, the position of the floating insert is set by the balance of the above mentioned forces. Thereby, the differences of the pressure acting on the sliding piston can be utilized to control the position of the sliding piston automatically and, in particular, without any actuating means.

According to a second aspect of the present invention, a turbocharger comprises a turbine according to the first aspect and the associated preferable forms.

In the following, preferred embodiments and further technical solutions are described in detail with reference to the accompanying drawings.

Figure 1:
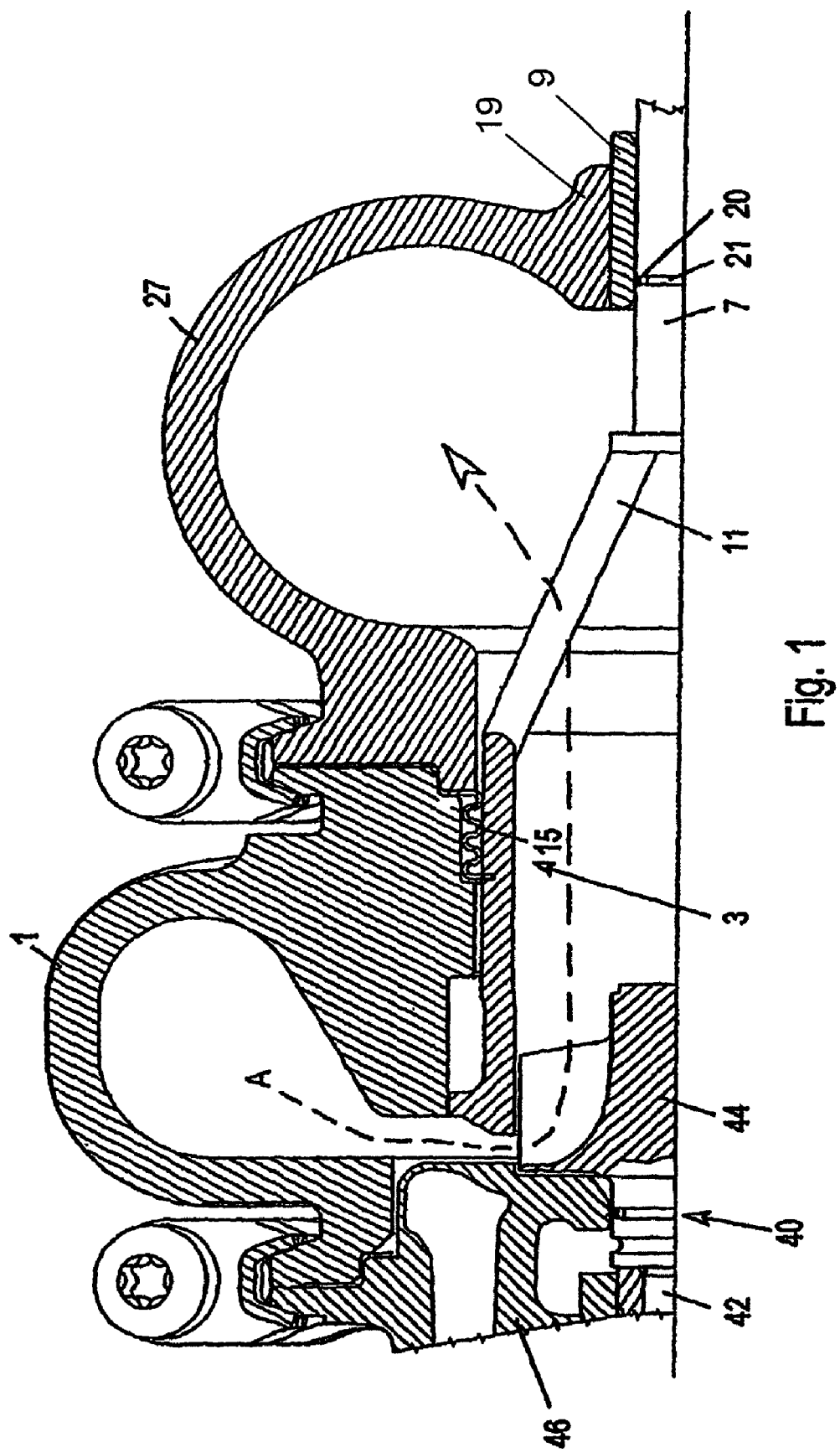
FIG. 1 is a sectional view of the turbine portion of the turbocharger according to the present invention.

In the following, the structure of the turbine portion of the turbocharger according to the present invention is explained with reference to FIG. 1. In general, a turbocharger comprises a compressor (not shown) and a turbine 40. An impeller of the compressor of the turbocharger is mounted on a shaft 42 which is driven by a wheel 44 of the exhaust gas turbine which, in turn, is driven by exhaust gas led towards the turbine wheel 44.

The turbine comprises a nozzle which is formed by an annular passage encompassing the turbine wheel 44. According to the present embodiment, the annular passage is formed by an inner wall of the center housing 46 and an outer wall which is formed by a front portion of a floating insert 3, a portion of which is arranged around the turbine wheel.

A front portion of the floating insert 3 is supported by a sliding shaft 7 by a support element 11. The support element 11 according to the present embodiment comprises a plurality (e.g. three) rods. The rods are spaced from each other in the circumferential direction so as to enable a flow of exhaust gas through clearances between the same. The exhaust gas flowing through said clearances is passed to a circumferential volute chamber formed by a discharge housing 27. The discharge housing 27 comprises an outlet (not shown) for discharging the exhaust gas from said discharge housing 27.

The turbine wheel 44 is disposed on the left side of the discharge housing 27 into which exhaust gas is discharged after the exhaust gas has been expanded while traveling through the turbine wheel 44.

The free end of the sliding shaft 7 is slidable supported by a bushing 9. This support enables a smooth and accurate movement of the sliding shaft 7 and the entire floating insert 3 in the axial direction of the sliding shaft 7. The bushing 9 for supporting the sliding shaft 7 is fit into a hole which is formed in a boss 19 of the discharge housing 27.

A sealing ring such as a piston ring 20 is inserted into a circumferential groove 21 formed at the sliding shaft 7. However, this sealing ring is optional and can be omitted.

A sealing means 15 in the shape of bellows is interposed between the outer circumference of the piston of the floating insert 3 and the inner circumference of the turbine housing 1, particular, is set into a gap there between.

In the following, the operation of the structure shown in FIG. 1 is explained.

For adjusting the annular passage for passing the exhaust gas towards the wheel 44 of the turbine 40, the axial distance between the inner wall of the turbine housing 1 and the outer wall formed at the end of the floating insert 3 is changed. Thereby, the opening area of the nozzle can be adjusted so as to achieve optimum settings of the turbocharger system.

Furthermore, the exhaust gas which is discharged from the turbine flows towards the discharge housing 27 as indicated by an arrow A in FIG. 1. The exhaust gas is directed towards the interior of the discharge housing 27. Finally, the exhaust gas, which is directed as described above, is discharged from the discharge housing 27 to an exhaust system (not shown).

A first embodiment of the present invention is explained with reference to and FIG. 2. A detailed sectional view of a turbine housing of a turbine according to a first embodiment of the present invention is shown in FIG. 2.

Figure 2:
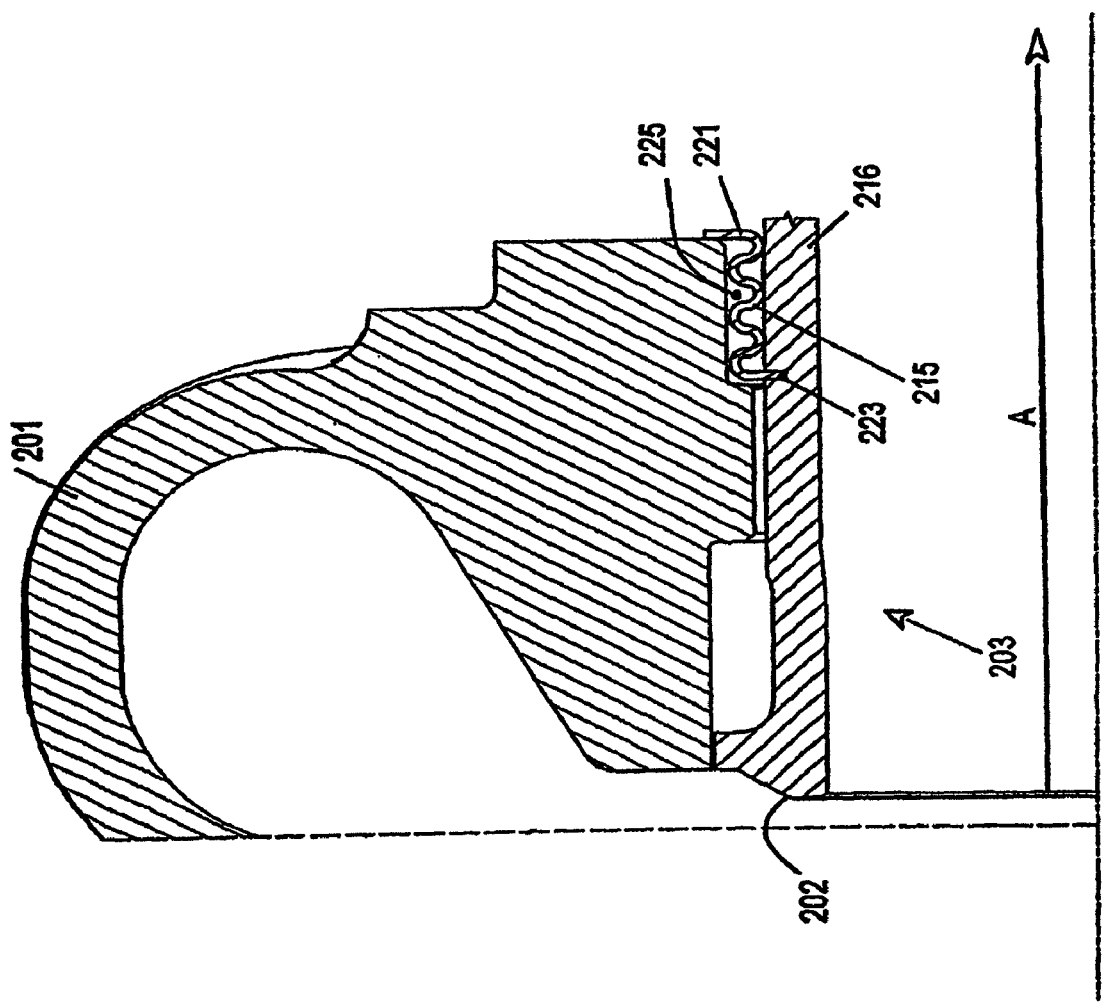
FIG. 2 is a detailed sectional view of a housing portion of a turbine according to a first embodiment of the present invention.

FIG. 2 shows a portion of a turbocharger, in particular, a portion of a turbine of said turbocharger which is shown in FIG. 1.

The floating insert 203 of the present embodiment comprises a piston 216 which is formed at an end of the floating insert which faces towards the turbine. A boss portion in the shape of a collar is formed at the end of the piston which faces towards the turbine, which serves as the outer wall 202 of the nozzle. The piston 216 is accommodated in a cavity with a gap 225 formed between the outer circumference of the piston and the inner circumference of the cavity. A portion of the gap 225 provides an increased clearance between the piston and the cavity.

A sealing means 215, such as bellows, is disposed in the radial gap 225 between the piston and the cavity. The bellows 215 is formed axially symmetric wherein the diameter of the bellows 215 is selected so as to fit in the gap in its contracted or extended position. In the present embodiment, the inner diameter of the bellows 215 substantially corresponds to the outer diameter of the piston 216.

The bellows comprises an end which is attached to a surface of the turbine housing 201 so as to form a fixed end 221. The other end of the bellows 215 is attached to the piston of the floating insert 203 so as to form a movable end 223.

The movable end 223 is fit into an annular recess which is formed in the outer circumference of the piston. Both the fixed and the movable end can be glued or welded to the turbine housing 201. Furthermore, in the present embodiment, the movable end 223 of the bellows 215 is disposed at the end of the bellows 215, which faces towards the turbine, whereas the fixed end 221 of the bellows 215 is disposed at the opposite end.

The exhaust gas at the side of the floating insert facing towards the turbine wheel, that is the left hand side in FIG. 2, is a high pressure exhaust gas. Also, the gas at the outer circumference of the floating insert upstream of said bellows is a high pressure exhaust gas. The pressure of the exhaust gas in the exhaust housing 27, shown in FIG. 1, is lower than the pressure on the upstream side from the floating insert.

Therefore, the exhaust gas would be forced through the gap between the floating insert 203 and the housing, which, however, is prevented by the sealing means 215. In other words, the sealing means 215 cuts off the flow through the gap between the floating insert 203 and the housing 201.

The sealing means 215 according to the present embodiment can be provided with a spring function which is effected by selecting a material of the bellows having a predetermined flexibility. As an alternative, a composite material including spring steel or the like can be employed. Thereby, a force in the longitudinal direction of the turbine is applied from the floating insert 203 to the turbine housing 201. The force can act as a return force for returning the floating insert 203 to a predetermined position when not operated. However, the force can act as an urging force which urges the floating insert towards a predetermined direction, e.g. towards an actuating mechanism (not shown) so as to maintain the contact between the associated elements.

Figure 3:
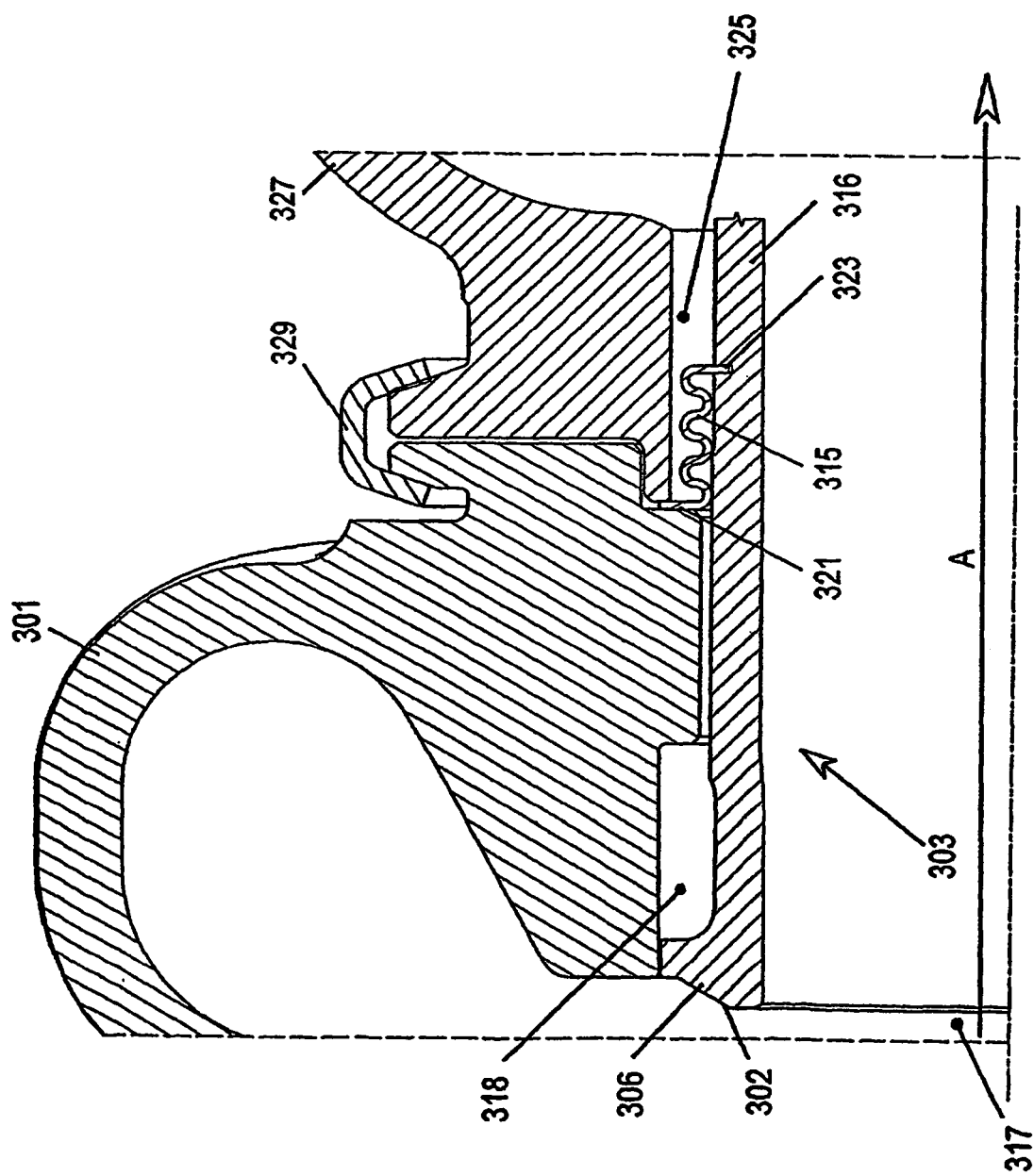
FIG. 3 is a detailed sectional view of a turbine housing and of a discharge housing of a turbine according to a second embodiment of the present invention.

In the following, a second embodiment is explained with reference to FIG. 3. The structure of the embodiment shown in FIG. 3 is basically the same as the structure shown in FIG. 2. In the following, merely the differences between the structures shown in FIG. 2 and FIG. 3 are explained.

The turbine according to the second embodiment of the present invention comprises a turbine housing 301, a floating insert 303 which includes a piston forming an outer wall 302, wherein the floating insert 303 is accommodated by a cavity of the housing. Between the floating insert 303 and the cavity, a space 325 is formed. A sealing means 315 is disposed in the space 315 and comprises a fixed end 321 and a movable end 323.

In the present modification, the fixed end 321 is clamped between a surface of the turbine housing 301 and a surface of a discharge housing 327. In particular, the fixed end 321 is disposed between axially opposing surfaces of the turbine housing 301 and the discharge housing 327 and kept in position by pressing said surfaces to each other by a clamp 329. The clamp 329 is disposed at a mating area of the outer circumference of the turbine housing 301 and of the discharge housing 327. However, any other means for connecting the housing portions with each other can be employed, such as a welding means, bolting joints or the like, as long as the housing portions are fixedly connected with each other.

Furthermore, in the present embodiment, the fixed end 321 of the bellows 315 is disposed at the end of the bellows 315, which faces towards the turbine, whereas the movable end 323 of the bellows 315 is disposed at the opposite end.

The effects and advantages of the second embodiment are the same as those of the first embodiment.

Figure 4:
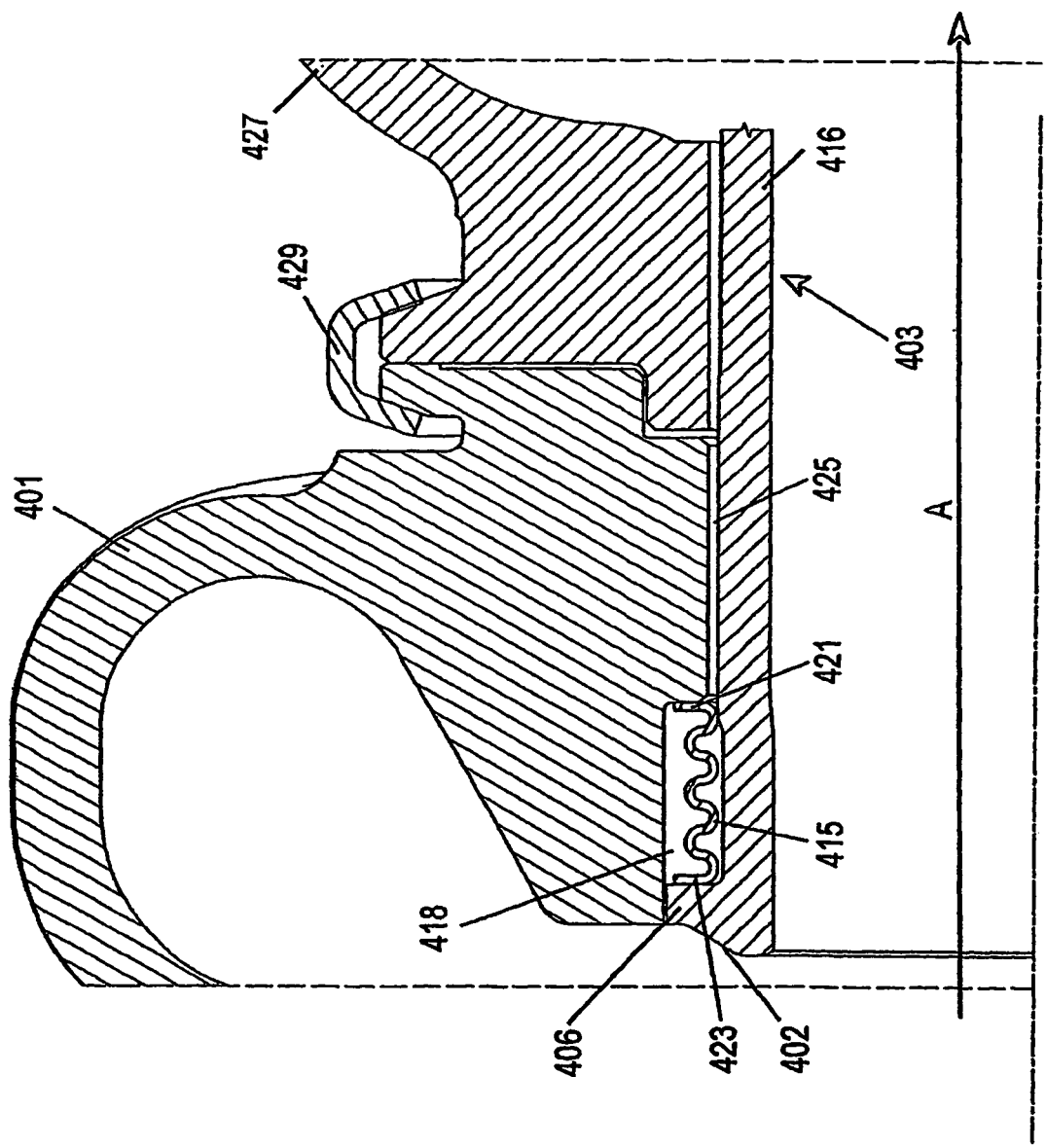
FIG. 4 is a detailed sectional view of a turbine housing and of a discharge housing of a turbine according to a third embodiment of the present invention.

In the following, a third embodiment is explained with reference to FIG. 4. The structure of the modification shown in FIG. 4 is basically the same as the structure shown in FIG. 2. In the following, merely the differences between the structures shown in FIG. 2 and FIG. 4 are explained.

The turbine according to the third embodiment of the present invention comprises a turbine housing 401, a floating insert 403 which includes a piston 416 forming an outer wall 402, wherein the floating insert 403 is accommodated in a cavity of the turbine housing 401. A discharge housing 427 is provided at one end of the turbine housing 401. The discharge housing 427 is attached to the turbine housing by clamps 429 which presses the mating surface of the outlet case 427 towards the turbine housing 401. However, any other means for connecting the housing portions with each other can be employed, such a welding means, bolting joints or the like, as long as the housing portions are fixedly connected with each other.

Between the floating insert 403 and the cavity, a space 425 is formed. On the side of the boss portion 406 opposite to the outer wall 402, the space 425 is extended in the radial direction such that the boss portion 406 of the floating insert 403 is accommodated if the piston 416 of the floating insert is axially moved. In this extended space 425, a sealing means 415 is disposed and comprises a fixed end 421 and a movable end 423.

As shown in FIG. 4, the fixed end 421 of the bellows is attached to a surface which defines a radial space 418 formed due to the radial extension of the space 425 and which faces towards the turbine. The movable end 423 of the bellows 415 is attached to the backside of the outer wall 402 at the piston. That is, the fixed and movable ends of the bellows 415 are attached to opposing surfaces which a relatively movable.

The effects and advantages of the second embodiment are the same as those of the first embodiment.

As a further option applicable to each of the above mentioned embodiments, the operation of the floating insert can be achieved by using the difference in pressures acting on the floating insert. That is, the position of the floating insert is set by balancing the urging force of the bellows with respect to the displacement thereof and the pressure forces acting on the floating insert. This, in turn, provides an automatically operated floating insert which is brought to the required axial position based on the pressure conditions in the system.

However, any actuating means for operating the floating insert can be employed, such as electromagnetic, hydraulic or other means, as long as the position can be set in accordance with the operational requirements.

The invention is not limited to the above described embodiments. In particular, the single structures according to the above explained embodiments can be freely combined with each other.

The invention claimed is:

1. A turbine for a turbocharger, comprising:
a turbine housing defining a cavity having a radially inwardly facing surface;
a piston disposed in the cavity and axially slidable therein, a nozzle being defined between an end of the piston and an opposing fixed wall, the piston being axially slidable to vary a width of the nozzle, the piston having a radially outwardly facing surface, a radial gap being defined between the radially outwardly facing surface of the piston and the radially inwardly facing surface of the cavity; and
an axially expandable sealing member having one fixed end attached to the turbine housing and an opposite movable end attached to the piston, wherein the movable end of the sealing member is fit into a recess formed in the radially outwardly facing surface of the piston, the sealing member cutting off a flow of exhaust gas through said radial gap.

2. The turbine of claim 1, wherein the sealing member comprises a bellows having a substantially cylindrical shape.

3. The turbine of claim 1, wherein the sealing member is elastic and exerts a spring force between the turbine housing and the piston urging the piston in a predetermined direction.

4. The turbine of claim 3, wherein said spring force depends on axial position of the piston.

5. The turbine of claim 4, wherein the axial position of the piston is determined by said spring force on the piston and a resulting force on the piston generated by differential pressures acting on the piston.

6. A turbine for a turbocharger, comprising:
a turbine housing defining a cavity having a radially inwardly facing surface;
a piston disposed in the cavity and axially slidable therein, a nozzle being defined between an end of the piston and an opposing fixed wall, the piston being axially slidable to vary a width of the nozzle, the piston having a radially outwardly facing surface, a radial gap being defined between the radially outwardly facing surface of the piston and the radially inwardly facing surface of the cavity; and
an axially expandable sealing member having one fixed end attached to the turbine housing and an opposite movable end attached to the piston, wherein the fixed end of the sealing member is clamped between the turbine housing and a separately formed gas discharge housing, the sealing member cutting off a flow of exhaust gas through said radial gap.

7. The turbine of claim 6, wherein the gas discharge housing is attached to the turbine housing by a clamp.

8. A turbocharger, comprising a compressor for compressing a fluid and a turbine as defined in claim 1.

9. A turbocharger, comprising a compressor for compressing a fluid and a turbine as defined in claim 6.

* * * * *